United States Patent Office 3,097,211
Patented July 9, 1963

---

3,097,211
QUATERNARY AMMONIUM SALTS OF N-TERTIARYAMINO-ALKYL-TERTIARY-AMINO - LOWER-ALKANAMIDES
Alexander R. Surrey, Albany, and Arthur J. Olivet, Colonie, N.Y., assignors to Sterling Drug Inc., New York, N.Y., a corporation of Delaware
No Drawing. Filed Jan. 25, 1960, Ser. No. 4,171
5 Claims. (Cl. 260—326.3)

This invention relates to compositions of matter classified in the art of chemistry as bis-quaternary-ammonium salts and to processes and intermediates for making such compositions.

The invention sought to be claimed, in its composition aspect, resides in the concept of chemical compounds having a molecular structure in which the amide nitrogen atom of a (lower-quaternary-ammonium)-polycarbon-lower-alkanamide moiety is attached to the omega carbon atom of a (lower-quaternary-ammonium)-polycarbon-lower-alkylene moiety. The structures are properly termed "N-[(lower-quaternary-ammonium) - polycarbon-lower-alkyl)]-(lower - quaternary - ammonium)-polycarbon-lower-alkanamides."

The invention sought to be claimed, in its process aspect, resides in the concept of embodying such molecular structure in tangible form by reacting an N-[(lower-tertiary-amino)-(polycarbon-lower-alkyl)]-(lower - tertiary-amino)-polycarbon-lower-alkanamide with at least two molar equivalents a lower-alkyl, lower-alkenyl or lower-aralkyl salt of a strong inorganic acid or an organic sulfonic acid.

The tangible embodiments of the invention are white or light tan, crystalline solids, soluble in water.

We have found that the tangible embodiments of the invention possess the inherent applied use characteristics of exerting a ganglionic blocking effect in animal organisms as evidenced by pharmacological evaluation in cats according to standard test procedures.

Among the bis-quaternary-ammonium salts of our invention are those represented by the structural Formula I

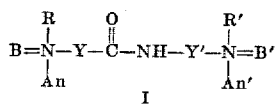

where N=B and N=B' are lower-tertiary-amino radicals, R and R' are lower-alkyl, lower-alkenyl or lower-aralkyl radicals, An and An' are anions, and Y and Y' are straight-chained alkylene radicals having from two to four carbon atoms.

The term "lower-tertiary-amino," as used herein and designated as N=B or N=B', comprehends pharmacodynamically acceptable lower-tertiary-amino radicals, including di-(lower-alkyl)amino radicals where the lower-alkyl radicals are alike or different and each alkyl radical has preferably from one to six carbon atoms, such dialkylamino radicals including dimethylamino, diethylamino, ethyl-methylamino, diisopropylamino, di-n-hexylamino, and the like. The designations N=B and N=B', which can be the same or different, also comprehend saturated N-heteromonocyclic radicals having five to six ring atoms, illustrated by 1-piperidyl; (lower-alkylated)-1-piperidyl including 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl including 2-methyl-1-pyrrolidyl, 3-ethyl-1-pyrrolidyl, 2,5-dimethyl-1-pyrrolidyl; 4-morpholinyl; and the like.

As herein used, the term "lower-alkyl" means straight and branched monovalent aliphatic hydrocarbon radicals having the empirical formula —$C_mH_{2m+1}$ wherein "m" is an integer from one to six, inclusive, among which are, for the purposes of illustration and without limiting the generality of the foregoing, such radicals as: methyl, ethyl, n-propyl, isopropyl, n-butyl, isobutyl, 2-butyl, tertiary-butyl, n-amyl, and n-hexyl.

As herein used, the term "lower-alkenyl" means straight and branched monovalent aliphatic hydrocarbon radicals containing a double bond and having the empirical formula —$C_nH_{2n-1}$ wherein "n" is an integer from three to six, inclusive, among which are, for purposes of illustration and without limiting the generality of the foregoing, such radicals as: 2-propenyl or allyl, 2-methyl-2-propenyl, 2-butenyl, and 3-hexenyl.

As herein used, the term "lower-aralkyl" means the benzyl and phenethyl radicals and derivatives thereof substituted in any available position on the ring by from one to three simple substituents, among which are, for purposes of illustration and without limiting the generality of the foregoing, such substituents as: lower-alkyl, lower-alkoxy, halo, hydroxy, trifluoromethyl, nitro, amino, lower-alkylmercapto, lower-alkylsulfinyl, and lower-alkylsulfonyl.

The anions designated above as An and An' are preferably any pharmacodynamically acceptable anion, for instance, chloride, bromide, iodide, sulfate, phosphate, benzenesulfonate, paratoluenesulfonate, citrate, tartrate, and the like, and have no appreciable activity of their own in the high dilutions at which the quaternary ammonium salts as a whole are effective. In particular, the anions appear to contribute nothing to the pharmacodynamic properties which inhere to the cation portion of the compounds of the present invention. However, preferred compounds are those in which An and An' are halide, in particular, chloride, iodide or bromide. By a pharmacodynamically acceptable anion, we mean any anion which is innocuous to the animal organism in pharmacodynamic doses of the quaternary ammonium salt, so that beneficial physiological properties inherent in the cation are not vitiated by any possible side-effects ascribable to the anions; in other words, the latter do not substantially affect the pharmacodynamic properties inherent in the cations.

The term "polycarbon-lower-alkylene," as used herein and designated as "Y" or "Y'," means straight-chained alkylene radicals having from two to four carbon atoms, inclusive and is illustrated by —$CH_2CH_2$—,

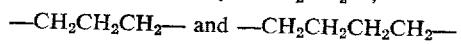

—$CH_2CH_2CH_2$— and —$CH_2CH_2CH_2CH_2$—

Compounds of our invention having Formula I where R and R' are the same and An and An' are the same are prepared by reacting an N-[(lower-tertiary-amino)-(polycarbon-lower-alkyl)]-(lower - tertiary - amino)-polycarbon-lower-alkanamide having the Formula II

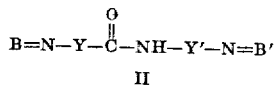

where N=B, Y, N=B' and Y' have the meanings given hereinabove, with at least two molar equivalents of a compound having the formula R—An where R has the meaning given above and An is the anion of a strong inorganic acid or an organic sulfonic acid. The reaction is carried out by mixing the reactants directly in the absence of a solvent or, preferably, in a reaction medium inert under the conditions of the reaction, such as acetonitrile, acetone, ethyl acetate, and the like. The reaction is carried out at room temperature or at higher temperatures up to about 100° C. to speed up the reaction, if desired. If an inert solvent is used, the quaternary ammonium salt product usually separates from solution at room temperature, or can be obtained by concentration of the solution, if necessary.

The quaternization reaction takes place most readily with esters R—An where An is the anion of a strong acid, e.g., halide, sulfate, phosphate, benzenesulfonate, and the like. The chloride, bromide, or iodide are preferred because of the more ready availability of the requisite lower-alkyl halides, lower-alkenyl halides or lower-aralkyl halides. Compounds wherein the anion An is other than halogen, for example, the nitrate, sulfate, phosphate, or benzenesulfonate, and in particular anions derived from weak acids such as the acetate, citrate, oleate, lactate, and the like, can be most conveniently prepared from the quaternary ammonium salts wherein An is halogen. This procedure is carried out by treating the bis-halide with silver oxide which produces the corresponding quaternary ammonium hydroxide, the halide ions being removed in the form of silver halide. The quaternary ammonium hydroxide can then be converted into any desired salt by neutralization with the appropriate acid. Alternatively, ion exchange can be effected by crystallization from an aqueous solution containing an excess of the desired anion, or by contact with an anion exchange resin saturated with the desired anion.

The intermediate amides of Formula II are prepared by reacting a lower-alkyl tertiary-aminoalkanoate of the formula B=N—Y—COO—(lower-alkyl) (III) with a tertiary-aminoalkylamine of the formula

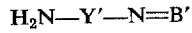

where B=N, Y, Y' and N=B' have the meanings given above. This reaction is conveniently carried out by heating the reactants in a reaction medium inert under the conditions of the reaction, such as mixed octanes having a boiling range of 100–140° C. (i.e., "Skellysolve E").

Compounds of our invention having Formula I where R and R' are different and An and An' are different can be prepared according to the following series of reactions:

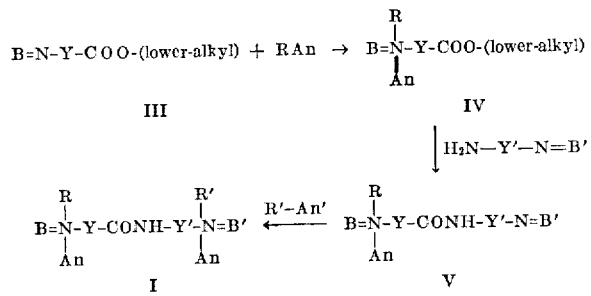

where B=N, Y, R, An, Y', N=B', R' and An' have meanings given above for Formula I. Thus, a lower-alkyl tertiary-aminoalkanoate (III) is quaternized with RAn to yield the lower-alkyl quaternary-ammoniumalkanoate (IV), which is reacted with the tertiary-aminoalkylamine $H_2N$—Y'—N=B' to give the N-(tertiary-aminoalkyl)-quaternary-ammonium-alkanamide (V). Quaternization of V with R'—An' results in formation of the desired unsymmetrical bis-quaternary (I).

Another aspect of our invention are the intermediate N - (tertiary - aminoalkyl)-tertiary-aminoalkanamides of Formula II. Also within the purview of this aspect of the invention are acid-addition salts of these intermediate amides of Formula II. As used in the appended claims, unless specifically designated otherwise, the term "N-[(lower-tertiary-amino) - (polycarbon - lower - alkyl)]-(lower - tertiary - amino)-polycarbon-lower-alkanamide" and terms subgeneric thereto mean both the free base form and the acid-addition salt form of the molecular structure recited.

The molecular structures of the compounds of our invention are established by their mode of syntheses and corroborated by the correspondence of calculated and found values for the elementary analyses for representative examples.

The following examples will further illustrate the invention without, however, limiting it thereto.

EXAMPLE 1

A. *N-(2-Di-n-Butylaminoethyl)-3-Di-n-Butylaminopropanamide*

A mixture containing 10.8 g. of methyl 3-di-n-butylaminopropanoate, 17.2 g. of 2-di-n-butylaminoethylamine, 100 cc. Skellysolve E (a mixture of octanes having a boiling range of about 100–140° C.) was refluxed gently for about twenty hours. After removal of the solvent by distilling in vacuo, the remaining reaction mixture was distilled under reduced pressure to yield 11 g. of N-(2-di-n-butylaminoethyl) - 3 - di-n-butylaminopropanamide, B.P. 154–157° C. at 0.05 mm., $n_d^{25} = 1.4645$.

*Anal.*—Calcd. for $C_{21}H_{45}N_3O$: N, 7.88. Found: N, 8.14.

Methyl 3-di-n-butylaminopropanoate was prepared by adding dropwise with stirring 43.0 g. of methyl acrylate to 64.6 g. of di-n-butylamine, using an ice bath to keep the reaction temperature below about 30° C. The reaction mixture was allowed to stand overnight and then distilled in vacuo to yield 65 g. of the ester, B.P 140–143° C. at 30 mm., $n_d^{25} = 1.4330$.

*Anal.*—Calcd. for $C_{12}H_{25}NO_2$: N, 6.51. Found: N, 6.56.

B. *N-(2-Di-n-Butylaminoethyl)-3-Di-n-Butylaminopropanamide Bis(Methiodide)*

To a solution of 3.6 g. of N-(2-di-n-butylaminoethyl)-3-di-n-butylaminopropanamide in 50 cc. of dry ethyl acetate was added 2 cc. of methyl iodide and the reaction mixture was allowed to stand at room temperature for about three hours. The precipitated product was collected by filtration and dried at 60° C. for forty-eight hours at 30 mm. to yield 4.5 g. of N-(2-di-n-butylaminoethyl) - 3 - di-n-butylaminopropanamide bis(methiodide), M.P. 165.9–173.4° C. (corr.).

*Anal.*—Calcd. for $C_{23}H_{51}I_2N_3O$: N, 6.57; I⁻, 39.70. Found: N, 6.73; I⁻, 39.60.

EXAMPLE 2

A. *N-(2-Diethylaminoethyl)-3-Diethylaminopropanamide*

This compound was prepared following the procedure described in Example 1A using 15.9 g. of methyl 3-diethylaminopropanoate, 17.4 g. of 2-diethylaminoethylamine and 100 cc. of Skellysolve E. There was thus obtained 10 g. of N-(2-diethylaminoethyl)-3-diethylaminopropanamide, B.P. 186–192° C. at 29 mm., $n_D^{25} = 1.4662$.

*Anal.*—Calcd. for $C_{13}H_{29}N_3O$: N, 11.51. Found: N, 11.18.

Methyl 3-diethylaminopropanoate was prepared according to the procedure given in Example 1A for the preparation of methyl 3-di-n-butylaminopropanoate using 36.5 g. of diethylamine and 43.0 g. of methyl acrylate. There was thus obtained 63 g. of the methyl ester, B.P. 85–86° C. and 27 mm., $n_D^{25} = 1.4252$.

*Anal.*—Calcd. for $C_8H_{17}NO_2$: N, 8.80. Found: N, 8.76.

B. *N-(2-Diethylaminoethyl)-3-Diethylaminopropanamide Bis(Ethiodide)*

Following the procedure described in Example 1B using 3.0 g. of N-(2-diethylaminoethyl)-3-diethylaminopropanamide, 3 cc. of ethyl iodide, 30 cc. of dry acetone and a reaction period of about twenty-four hours, there was thus obtained 2.5 g. of product, N-(2-diethylaminoethyl)-3-diethylaminopropanamide bis(ethiodide), M.P. 184.4–188.1° C. (corr.).

*Anal.*—Calcd. for $C_{17}H_{39}I_2N_3O$: N, 7.57; I⁻ 45.71. Found: N, 7.53; I⁻ 45.20.

By stirring an aqueous solution of N-(2-diethylaminoethyl)-3-diethylaminopropanamide bis(ethiodide) with an excess of silver oxide, filtering the suspension, and neutralizing the filtrate with at least two molar equivalents of sulfuric acid, phosphoric acid, acetic acid, lactic acid, tartaric acid, quinic acid or methanesulfonic acid, there can be obtained respectively, N-(2-diethylaminoethyl)-3-diethylaminopropanamide bis(ethosulfate), N-(2-diethylaminoethyl) - 3 - diethylaminopropanamide bis(ethophosphate), N-(2 - diethylaminoethyl)-3-diethylaminopropanamide bis(ethoacetate), N-(2-diethylaminoethyl) - 3 - diethylaminopropanamide bis(etholactate), N-(2-diethylaminoethyl)-3-diethylaminopropanamide bis(ethotartrate), N-(2-diethylaminoethyl)-3-diethylaminopropanamide bis(ethoquinate) or N - (2 - diethylaminoethyl) - 3 - diethylaminopropanamide bis(ethomethanesulfonate).

EXAMPLE 3

N-(2-Di-n-Butylaminoethyl)-3-Di-n-Butylaminopropanamide Bis(Ethiodide)

This preparation was carried out following the procedure described in Example 1B using 3.6 g. of N-(2-di-n-butylaminoethyl)-3-di-n-butylaminopropanamide, 2 cc. of ethyl iodide, 50 cc. of acetonitrile and a reaction period of about forty-eight hours. To the reaction mixture was added 100 cc. of ether and the precipitated product was collected and dried at 55° C. and 60 mm. for about twenty-four hours. There was thus obtained 3 g. of N-(2-di - n - butylaminoethyl)-3-dibutylaminopropanamide bis (ethiodide), M.P. 165.4–171.0° C. (corr.).

*Anal.*—Calcd. for $C_{25}H_{55}I_2N_3O$: N 6.30; I⁻ 38.02. Found: N, 6.32; I⁻ 37.65.

EXAMPLE 4

A. N-(3-Diethylaminopropyl)-3-Diethylaminopropanamide

This intermediate amide was prepared following the procedure described in Example 1A using 15.9 g. of methyl 3-diethylaminopropanoate, 26.0 g. of 3-diethylaminopropylamine and 100 cc. of Skellysolve E. There was obtained 16.5 g. of the amide, B.P. 151–154° C. at 0.5 mm., $n_D^{25}=1.4672$.

*Anal.*—Calcd. for $C_{14}H_{31}N_3O$: N, 10.88. Found: N, 10.88.

B. N-(3-Diethylaminopropyl)-3-Diethylaminopropanamide Bis(Methiodide)

This compound was prepared following the procedure described in Example 1B using 2.6 g. of N-(3-diethylaminopropyl) - 3 - diethylaminopropanamide, 2 cc. of methyl iodide and 20 cc. of dry acetone. The product precipitated in about five minutes and was collected after the reaction mixture had been allowed to stand for one hour. There was obtained about 5 g. of N-(3-diethylaminopropyl) - 3 - diethylaminopropanamide bis(methiodide), M.P. 133.8–137.0° C. (corr.).

*Anal.*—Calcd. for $C_{16}H_{37}I_2N_3O$: N, 7.76; I⁻ 46.90. Found: N, 7.71; I⁻ 47.00.

EXAMPLE 5

N-(3-Diethylaminopropyl)-3-Diethylaminopropanamide Bis(Ethiodide)

This preparation was carried out following the procedure described in Example 1B using 2.6 g. of N-(3-diethylaminopropyl)-3-diethylaminopropanamide, 2 cc. of ethyl iodide, 20 cc. of acetonitrile and a reaction period of about twenty-four hours. The product separated after an equal volume of ether was added. There was obtained 2.5 g. of N-(3-diethylaminopropyl)-3-diethylaminopropanamide bis(ethiodide), M.P. 174.7–178.0° C. (corr.).

*Anal.*—Calcd. for $C_{18}H_{41}I_2N_3O$: N, 7.38; I⁻, 44.58. Found: N, 7.45; I⁻, 43.80.

EXAMPLE 6

A. N-(2-Di-n-Butylaminoethyl)-3-Diethylaminopropanamide

This compound was prepared following the procedure described in Example 1A using 10.4 g. of methyl 3-diethylaminopropanoate, 25.8 g. of 2-di-n-butylaminoethylamine, 100 cc. of Skellysolve E and a reflux period of about twenty hours. There was obtained 11 g. of N-(2-di - n-butylaminoethyl)-3-diethylaminopropanamide, B.P. 164–168° C. at 0.60 mm., $n_D^{25}=1.4648$.

*Anal.*—Calcd. for $C_{17}H_{37}N_3O$: N, 9.36. Found: N, 9.27.

B. N-(2-Di-n-Butylaminoethyl)-3-Diethylaminopropanamide Bis(Methiodide)

This compound was prepared following the procedure described in Example 1B using 2.9 g. of N-(2-di-n-butylaminoethyl)-3-diethylaminopropanamide, 2 cc. of methyl iodide, 20 cc. of acetonitrile and a reaction period of about twenty-four hours. The product was obtained after addition of ether to the reaction mixture until the solution became turbid, followed by a little isopropyl alcohol; the mixture was then allowed to stand for one week, at the end of which time the product was collected and dried. There was obtained 3.5 g. of N-(2-di-n-butylaminoethyl)-3-diethylaminopropanamide bis(methiodide). M.P. 91.5–103.1° C. (corr.).

*Anal.*—Calcd. for $C_{19}H_{43}I_2N_3O$: N, 7.20; I, 43.51. Found: N, 7.13; I, 43.00.

EXAMPLE 7

A. N-(2-Diethylaminoethyl)-3-(1-Pyrrolidyl)Propanamide

This basic amide was prepared following the procedure described in Example 1A using 15.1 g. of methyl 3-(1-pyrrolidyl)propanoate, 23.2 g. of 2-diethylaminoethylamine, 100 cc. of Skellysolve E and a reflux period of twenty hours. There was obtained 18 g. of N-(2-diethylaminoethyl)-3-(1-pyrrolidyl)propanamide, B.P. 155–156° C. at 1.0 mm., $n_D^{25}=1.4809$.

*Anal.*—Calcd. for $C_{13}H_{27}N_3O$: N, 11.61. Found: N, 11.42.

Methyl 3-(1-pyrrolidyl)propanoate was prepared following the procedure described in Example 1A using 43.0 g. of methyl acrylate and 35.6 g. of pyrrolidine. There was obtained 72 g. of the methyl ester, B.P. 51–53° C. at 0.6 mm., $n_D^{25}=1.4490$.

*Anal.*—Calcd. for $C_8H_{15}NO_2$: N, 8.91. Found: N, 8.85.

B. N-(2-Diethylaminoethyl)-3-(1-Pyrrolidyl)Propanamide Bis(Methiodide)

Following the procedure described in Example 1B using 2.4 g. of N-(2-diethylaminoethyl)-3-(1-pyrrolidyl)-propanamide, 2 cc. of methyl iodide, 20 cc. of dry acetone and a reaction period of about fifteen minutes, there was obtained 4 g. of N-(2-diethylaminoethyl)-3-(1-pyrrolidyl)-propanamide bis(methiodide) M.P. 209.6–210.4° C. (corr.).

*Anal.*—Calcd. for $C_{15}H_{33}I_2N_3O$: N, 8.00; I⁻, 48.34. Found: N, 7.90; I⁻, 48.40.

EXAMPLE 8

N-(2-Diethylaminoethyl)-3-(1-Pyrrolidyl)Propanamide Bis(Ethiodide)

This preparation was carried out following the procedure described in Example 1B using 4.8 g. of N-(2-diethylaminoethyl)-3-(1-pyrrolidyl)propanamide, 3 cc. of ethyl iodide, 20 cc. of dry acetone, and a reaction period of about forty-eight hours. There was obtained 2 g. of N-(2-diethylaminoethyl) - 3 - (1-pyrrolidyl)propanamide bis(ethiodide), M.P. 198.0–199.2° C. (corr.) after one recrystallization from isopropyl alcohol-ethyl alcohol.

*Anal.*—Calcd. for $C_{17}H_{37}I_2N_3O$: N, 7.60; I−, 45.88. Found: N, 7.65; I−, 45.80.

EXAMPLE 9

A. *N-(3-Dimethylaminopropyl)-3-(1-Pyrrolidyl)Propanamide*

This intermediate basic amide was prepared following the procedure described in Example 1A using 15.7 g. of methyl 3-(1-pyrrolidyl)propanoate, 20.4 g. of 3-dimethylaminopropylamine, 100 cc. of Skellysolve E and a reflux period of twenty-four hours. There was obtained 19 g. of N-(3-dimethylaminopropyl) - 3 - (1 - pyrrolidyl)propanamide, B.P. 150–152° C. at 0.6 mm., $n_D^{25} = 1.4840$.

*Anal.*—Calcd. for $C_{12}H_{25}N_3O$: N, 12.32. Found: N, 12.55.

B. *N-(3-Dimethylaminopropyl)-3-(1-Pyrrolidyl)Propanamide Bis(Ethiodide)*

Following the procedure described in Example 1B using 4.5 g. of N-(3-dimethylaminopropyl)-3-(1-pyrrolidyl)-propanamide, 2 cc. of ethyl iodide, 20 cc. of ethyl acetate and a reaction period of forty-eight hours, there was obtained 6.5 g. of N-(3-dimethylaminopropyl)-3-(1-pyrrolidyl)propanamide bis(ethiodide), M.P. 147.8–159.0° C. (corr.) after one recrystallization from ethyl alcohol.

*Anal.*—Calcd. for $C_{16}H_{35}I_2N_3O$: N, 7.79; I−, 47.08. Found: N, 7.84; I−, 47.10.

EXAMPLE 10

A. *N-(2-Diethylaminoethyl)-3-(1-Piperidyl)Propanamide*

This basic amide was prepared following the procedure described in Example 1A using 17.1 g. of methyl 3-(1-piperidyl)propanoate, 23.2 g. of 2-diethylaminoethylamine, 100 cc. of Skellysolve E and a reaction period of twenty-four hours. There was obtained 18 g. of N-(2-diethylaminoethyl) - 3 - (1-piperidyl)propanamide, B.P. 156–158° C. at 0.075 mm., $n_D^{25} = 1.4822$.

*Anal.*—Calcd. for $C_{14}H_{29}N_3O$: N, 10.97. Found: N, 10.96.

Methyl 3-(1-piperidyl)propanoate was prepared following the procedure described in Example 1A using 43.0 g. of methyl acrylate and 42.6 g. of piperidine. There was obtained 78 g. of the ester, B.P. 67–68° C. at 0.9 mm., $n_D^{25} = 1.4545$.

*Anal.*—Calcd. for $C_9H_{17}NO_2$: N, 8.18. Found: N, 8.22.

B. *N-(2-Diethylaminoethyl)-3-(1-Piperidyl)Propanamide Bis(Ethiodide)*

Following the procedure described in Example 1B using 5.0 g. of N-(2-diethylaminoethyl)-3-(1-piperidyl)propanamide, 2 cc. of ethyl iodide, 25 cc. of ethyl acetate and a reaction period of forty-eight hours, there was obtained 4 g. of N-(2-diethylaminoethyl)-3-(1-piperidyl)-propanamide bis(ethiodide), M.P. 188.0–189.8° C. (corr.).

*Anal.*—Calcd. $C_{18}H_{39}I_2N_3O$: N, 7.41; I−, 44.74. Found: N, 7.27; I−, 44.60.

EXAMPLE 11

A. *N-(3-Diethylaminopropyl)-3-(1-Piperidyl)Propanamide*

This basic amide was prepared following the procedure described in Example 1A using 17.1 g. of methyl 3-(1-piperidyl)propanoate, 26 g. of 3-diethylaminopropylamine, 100 cc. of Skellysolve E and a reflux period of twenty-four hours. There was obtained 21 g. of the product, B.P. 170–173° C. at 0.4 mm., $n_D^{25} = 1.4822$.

*Anal.*—Calcd. for $C_{15}H_{31}N_3O$: N, 10.40. Found: N, 10.51.

B. *N-(3-Diethylaminopropyl)-3-(1-Piperidyl)Propanamide Bis(Methiodide)*

This preparation was carried out following the procedure described in Example 1B using 5.4 g. of N-(3-diethylaminopropyl)-3-(1-piperidyl)propanamide, 2 cc. of methyl iodide, 25 cc. of acetonitrile and a reaction period of twenty-four hours. There was obtained 4 g. of N-(3-diethylaminopropyl)-3-(1-piperidyl)propanamide bis(methiodide), M.P. 129.4–133.2° C. (corr.) after one recrystallization from ethyl alcohol.

*Anal.*—Calcd. for $C_{17}H_{37}I_2N_3O$: N, 7.60; I−, 45.88. Found: N, 7.53; I−, 45.30.

EXAMPLE 12

A. *N-(4-Di-n-Butylaminobutyl)-3-Di-n-Butylaminopropanamide*

This basic amide was prepared following the procedure described in Example 1A using 10.8 g. of methyl 3-di-n-butylaminopropanoate, 20 g. of 4-di-n-butylaminobutylamine, 100 cc. of Skellysolve E and a reflux period of twenty-four hours. There was thus obtained 7 g. of the basic amide, B.P. 184–187° C. at 0.06 mm., $n_D^{25} = 1.4657$, after one redistillation.

*Anal.*—Calcd. for $C_{23}H_{49}N_3O$: $N_{AP}$, 7.31; N, 10.95. Found: $N_{AP}$, 7.41; N, 11.13.

B. *N-(4-Di-n-Butylaminobutyl)-3-Di-n-Butylaminopropanamide Bis(n-Butochloride)*

This compound was prepared following the procedure described in Example 1B using the basic amide prepared in Example 12A and n-butyl chloride.

Other representative N-[(lower-quaternary-ammonium) - (polycarbon-lower-alkyl)] - (lower-quaternary-ammonium)-polycarbon-lower-alkanamides that can be prepared according to the foregoing procedures using the appropriate N-[(lower-tertiary-amino) - (polycarbon-lower-alkyl)] - (lower-tertiary-amino) - polycarbon-lower-alkanamide and quaternizing agent R—An are the following compounds of Examples 13–25 inclusive.

EXAMPLE 13

N-(3-dimethylamino - 2 - propyl)-4-(4-morpholinyl) butanamide bis(n-propobromide) is obtained following the procedure described in Example 1B using N-(3-dimethylamino - 2 - propyl)-4-(4-morpholinyl)butanamide and n-propyl bromide.

EXAMPLE 14

N-[2-(2,6-dimethyl - 1 - piperidyl)ethyl] - 5 - diethylaminopentanamide bis(allobromide) is obtained following the procedure described in Example 1B using N-[2-(2,6-dimethyl - 1 - piperidyl)ethyl] - 5 - diethylaminopentanamide and allyl bromide.

EXAMPLE 15

N-[2-(2,5-dimethyl - 1 - pyrrolidyl)ethyl] - 3 - (1-pyrrolidyl)butanamide bis(ethobromide) is obtained following the procedure described in Example 1B using N-[2-(2,5-dimethyl - 1 - pyrrolidyl)ethyl] - 3 - (1-pyrrolidyl)-butanamide and ethyl bromide.

EXAMPLE 16

N-[2-(4-methyl - 1 - piperidyl)ethyl] - 3 - (4-methyl-1-piperidyl)propanamide bis(isopropochloride) is obtained following the procedure described in Example 1B using N-[2-(4-methyl - 1 - piperidyl)ethyl] - 3 - (4-methyl-1-piperidyl)propanamide and isopropyl chloride.

EXAMPLE 17

N-[2-(di - n - hexylamino)ethyl] - 3 - dimethylaminopropanamide bis(methiodide) is obtained following the procedure described in Example 1B using N-[2-(di-n-hexylamino)ethyl] - 3 - dimethylaminopropanamide and methyl iodide.

EXAMPLE 18

N-[2-(4-morpholinyl)ethyl] - 3 - diethylaminopropanamide bis(etho-para-toluenesulfonate) is obtained following the procedure described in Example 1B using N-[2-(4-morpholinyl)ethyl] - 3 - diethylaminopropanamide and ethyl para-toluenesulfonate.

EXAMPLE 19

N-[2-(1-pyrrolidyl)ethyl] - 3 - (1-pyrrolidyl)propanamide bis(ethosulfate) is obtained following the procedure described in Example 1B using N-[2-(1-pyrrolidyl)-ethyl]-3-(1-pyrrolidyl)-propanamide and ethyl sulfate.

EXAMPLE 20

N-(3-dimethylaminopropyl) - 3 - (N-ethyl - N - methylamino)propanamide bis(n-hexiodide) is obtained following the procedure described in Example 1B using N-(3-dimethylaminopropyl) - 3 - (N-ethyl-N-methylamino)-propanamide and n-hexyl iodide.

EXAMPLE 21

N-(2-diethylaminoethyl) - 4 - diethylaminobutanamide bis(2-butenochloride) is obtained following the procedure described in Example 1B using N-(2-diethylaminoethyl)-4-diethylaminobutanamide and 2-butenyl chloride.

EXAMPLE 22

N-[2-(N-ethyl - N - methylamino)ethyl] - 3 - diethylaminopropanamide bis(benziodide) is obtained following the procedure described in Example 1B using N-[2-(N-ethyl - N - methylamino)ethyl] - 3 - diethylaminopropanamide and benzyl iodide.

EXAMPLE 23

N-[2-(1-pyrrolidyl)ethyl] - 3 - (1-pyrrolidyl)-propanamide bis(2-methoxybenzobromide) is obtained following the procedure described in Example 1B using N-[2-(1-pyrrolidyl)ethyl] - 3 - (1-pyrrolidyl)propanamide and 2-methoxybenzyl bromide.

EXAMPLE 24

N - (2 - diethylaminoethyl) - 3 - diethylaminopropanamide bis(4-chlorobenzochloride) is obtained following the procedure described in Example 1B using N-(2-diethylaminoethyl) - 3 - diethylaminopropanamide and 4-chlorobenzyl chloride.

EXAMPLE 25

N - (2 - diethylaminoethyl) - 3 - diethylaminopropanamide bis [2-(2,4-dichlorophenyl)ethochloride] is obtained following the procedure described in Example 1B using N-(2-diethylaminoethyl) - 3 - diethylaminopropanamide and 2-(2,4-dichlorophenyl)ethyl chloride.

EXAMPLE 26

N - [2 - (N-2-chlorobenzyl - N,N - diethylammonio)-ethyl] - 3 - (triethylammonio)propanamide dichloride is obtained by reacting N-(2-diethylaminoethyl)-3-(triethylammonio)propanamide chloride with 2-chlorobenzyl chloride. The intermediate N-(2-diethylaminoethyl)-3-(triethylammonio)propanamide chloride is prepared by first reacting methyl 3-diethylaminopropanoate with ethyl chloride and then reacting the resulting methyl 3-(triethylammonio)propanoate chloride with 2-diethylaminoethylamine.

The bis-quaternary salts of our invention having formula I were found to be effective as ganglionic blockers when tested by the cat nictitating membrane contraction method. These compounds can be formulated for use in the same way as conventional ganglionic blocking agents, such as hexamethonium salts. They can be formulated with the usual excipients into tablets or capsules for oral administration or dissolved under sterile conditions for parenteral injection.

We claim:

1. A compound having the formula

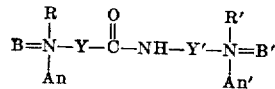

where N=B and N=B' are each selected from the group consisting of di-(lower-alkyl)amino, 1-piperidyl, (lower-alkylated)-1-piperidyl, 1-pyrrolidyl, (lower-alkylated)-1-pyrrolidyl and 4-morpholinyl, R and R' are members selected from the group consisting of lower-alkyl, lower-alkenyl and lower-aralkyl, An and An' are pharmacodynamically acceptable anions, and Y and Y' are each straight-chained alkylene having from two or four carbon atoms.

2. A compound having the formula of claim 1 where N=B and N=B' are each di-(lower-alkyl)amino, and R and R' are each lower-alkyl.

3. A compound having the formula of claim 1 where N=B is 1-pyrrolidyl, N=B' is di-(lower-alkyl)amino, and R and R' are each lower-alkyl.

4. A compound having the formula of claim 1 where N=B is 1-piperidyl, N=B' is di-(lower-alkyl) amino, and R and R' are each lower-alkyl.

5. N - (2 - diethylaminoethyl) - 3 - (1 - pyrrolidyl) propanamide bis(methiodide).

References Cited in the file of this patent

UNITED STATES PATENTS 2,857,390    Kirchner _____ Oct. 21, 1958

OTHER REFERENCES

Nazarov et al.: Zhur Obshchei Khim, vol. 27, pages 3309–14 (1957).

UNITED STATES PATENT OFFICE
CERTIFICATE OF CORRECTION

Patent No. 3,097,211                  July 9, 1963

Alexander R. Surrey et al.

It is hereby certified that error appears in the above numbered patent requiring correction and that the said Letters Patent should read as corrected below.

Column 3, lines 47 to 52, formula I should appear as shown below instead of as in the patent:

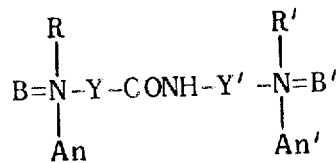

column 10, line 30, for "two or four" read -- two to four --.

Signed and sealed this 5th day of May 1964.

(SEAL)
Attest:

ERNEST W. SWIDER
Attesting Officer

EDWARD J. BRENNER
Commissioner of Patents